US005749087A

United States Patent [19]

Hoover et al.

[11] Patent Number: 5,749,087
[45] Date of Patent: May 5, 1998

[54] METHOD AND APPARATUS FOR MAINTAINING N-WAY ASSOCIATIVE DIRECTORIES UTILIZING A CONTENT ADDRESSABLE MEMORY

[75] Inventors: Russell D. Hoover, Rochester; George W. Nation, Eyota; Kenneth M. Valk, Rochester, all of Minn.

[73] Assignee: International Business Machines Corporation, Armonk, N.Y.

[21] Appl. No.: 688,313

[22] Filed: Jul. 30, 1996

[51] Int. Cl.$^6$ ..................................................... G06F 13/00
[52] U.S. Cl. ........................... 711/108; 711/128; 711/133; 711/141; 711/146; 364/DIG. 1
[58] Field of Search ...................... 395/435, 449, 395/455, 457, 460, 468, 473

[56] References Cited

U.S. PATENT DOCUMENTS

| | | | |
|---|---|---|---|
| 4,587,610 | 5/1986 | Rodman | 395/417 |
| 4,914,577 | 4/1990 | Stewart et al. | 395/417 |
| 4,972,338 | 11/1990 | Crawford et al. | 395/416 |
| 5,249,282 | 9/1993 | Segers | 395/440 |
| 5,261,106 | 11/1993 | Lentz et al. | 395/726 |
| 5,329,405 | 7/1994 | Hou et al. | 395/800 |
| 5,383,146 | 1/1995 | Threewitt | 365/49 |
| 5,404,482 | 4/1995 | Stamm et al. | 395/435 |
| 5,404,483 | 4/1995 | Stamm et al. | 395/435 |
| 5,414,704 | 5/1995 | Spinney | 370/60 |
| 5,457,788 | 10/1995 | Machida | 395/435 |
| 5,504,874 | 4/1996 | Galles et al. | 395/435 |
| 5,530,958 | 6/1996 | Agarwal et al. | 395/435 |
| 5,537,623 | 7/1996 | Chamberlain et al. | 395/435 |

*Primary Examiner*—Frank J. Asta
*Attorney, Agent, or Firm*—Joan Pennington

[57] ABSTRACT

A method and apparatus are provided for maintaining a N-way associative directory utilizing a content addressable memory (CAM). A congruence class from the N-way associative directory including a directory entry identified for a data operation is read into the CAM for the data operation. The directory entry for the data operation in the CAM is locked while the data operation is pending. Other entries in the congruence class are available. When the data operation is completed, checking for a state change is performed. Responsive to an identified state change, the directory entry for the data operation in the CAM is updated or marked as changed. The congruence class including the updated directory entry is marked as dirty. In accordance with features of the invention, the changed congruence class directory entries in the CAM are accumulated and scheduled to be written back to the N-way associative directory. The congruence classes including the changed directory entries in the CAM are written back to the N-way associative directory when the N-way associative directory is idle. After the congruence classes including the changed directory entries in the CAM are written back to the N-way associative directory, these CAM entries are marked as not busy and not dirty and can be reused.

16 Claims, 5 Drawing Sheets

METHOD AND APPARATUS FOR MAINTAINING N-WAY ASSOCIATIVE DIRECTORIES UTILIZING A CONTENT ADDRESSABLE MEMORY

FIELD OF THE INVENTION

The present invention relates to a N-way associative directory, and more particularly to an improved method and apparatus for maintaining a N-way associative directory utilizing a content addressable memory (CAM).

DESCRIPTION OF THE PRIOR ART

A content addressable memory (CAM) is known for many diverse uses. For example, known system have used a content addressable memory (CAM) for address translation, for example, as described in U.S. Pat. Nos. 4,972,282 and 5,457,788.

U.S. Pat. No. 5,249,282 discloses a cache memory for interfacing between a central processing unit and a main system memory. The cache memory includes a primary cache comprised of SRAMS and a secondary cache comprised of DRAM. A respective tag directory is associated with each of a plurality of secondary data cache memories. A respective content addressable memory (CAM) is associated with each of a plurality of primary data cache memories. Each of the CAMs stores data consisting of a tag and a value.

In cases where an N-way associative directory is used and operations on multiple lines (including when those lines belong to the same set) need to be performed in parallel, then when updating the directory a read modify write must be performed. For synchronous SRAMs, the performance degradation for changing from a write to a read, or from a read to a write can be significant. A need exists for a directory arrangement that provides improved efficient performance.

SUMMARY OF THE INVENTION

Important objects of the present invention are to provide an improved method and apparatus for maintaining a N-way associative directory utilizing a content addressable memory (CAM), to provide such apparatus and method substantially without negative effects and that overcome many disadvantages of prior art arrangements.

In brief, a method and apparatus are provided for maintaining a N-way associative directory utilizing a content addressable memory (CAM). A congruence class from the N-way associative directory including a directory entry identified for a data operation is read into the CAM for the data operation. The directory entry for the data operation in the CAM is locked while the data operation is pending. Other entries in the congruence class are available. When the data operation is completed, checking for a state change is performed. Responsive to an identified state change, the directory entry for the data operation in the CAM is updated or marked as changed or dirty.

In accordance with features of the invention, the changed directory entries in the CAM are accumulated and scheduled to be written back to the N-way associative directory. The changed directory entries in the CAM can be used again before being written back to the N-way associative directory. A congruence class including the changed directory entry in the CAM is written back to the N-way associative directory when the N-way associative directory is idle. After the directory entries in the CAM are written back to the N-way associative directory, these CAM entries are marked not busy and not dirty and can be reused.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

The present invention provides an improved directory arrangement and method for maintaining a global or N-way associative directory utilizing a content addressable memory (CAM) that can be used in supporting many processor caches, each with many outstanding operations; large numbers of line fill buffers in a processor (not shown); and in caches with many outstanding transactions, such as, shared caches and lock-up free caches.

Figure 1A:
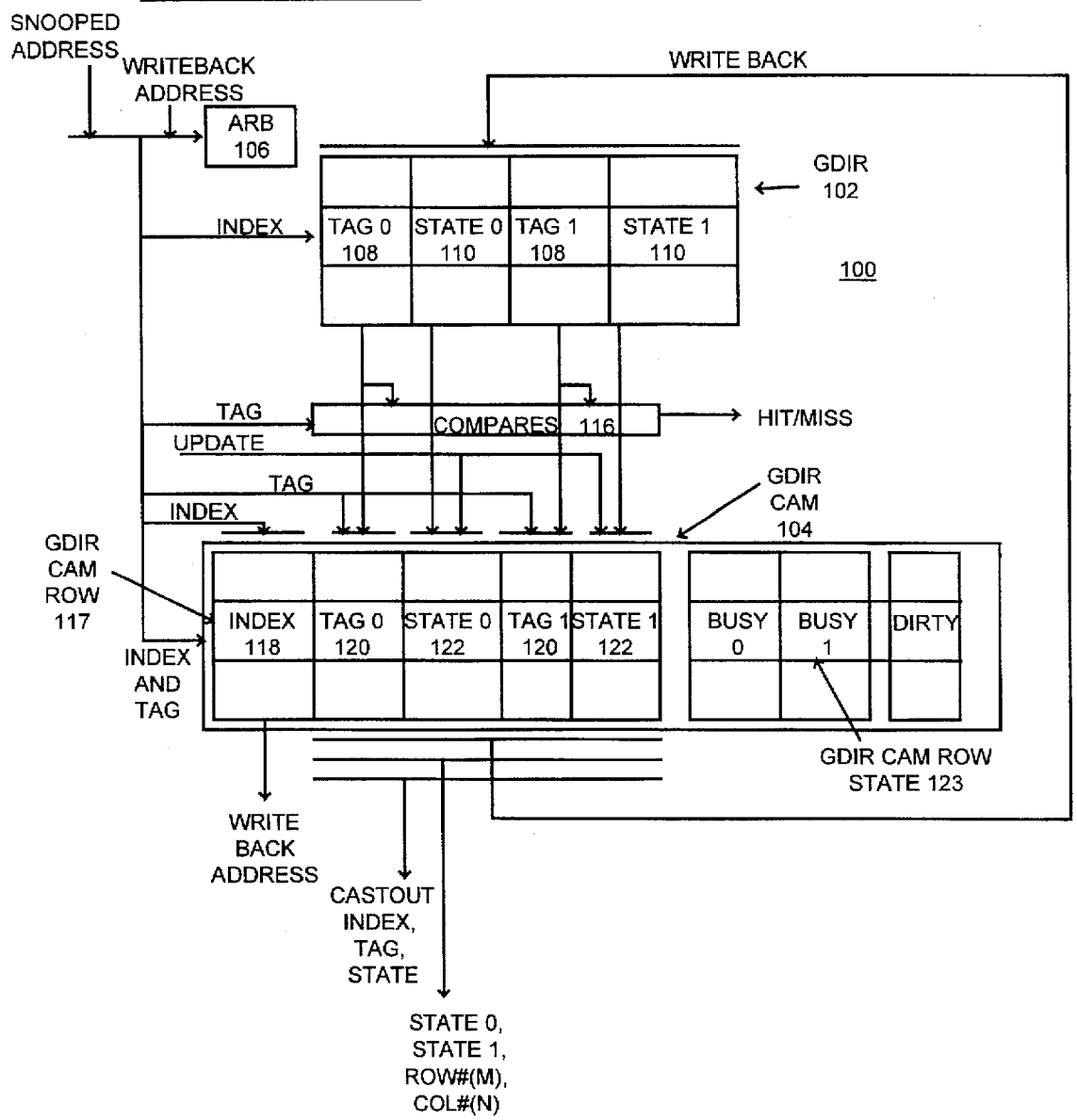
FIG. 1A is a functional data flow block diagram of a directory system including a global or N-way associative directory with a content addressable memory (CAM) in accordance with the present invention.
Figure 1B:
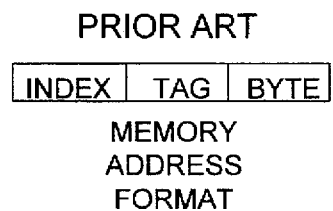
FIG. 1B is a block diagram illustrating a conventional memory address format.
Figure 1C:
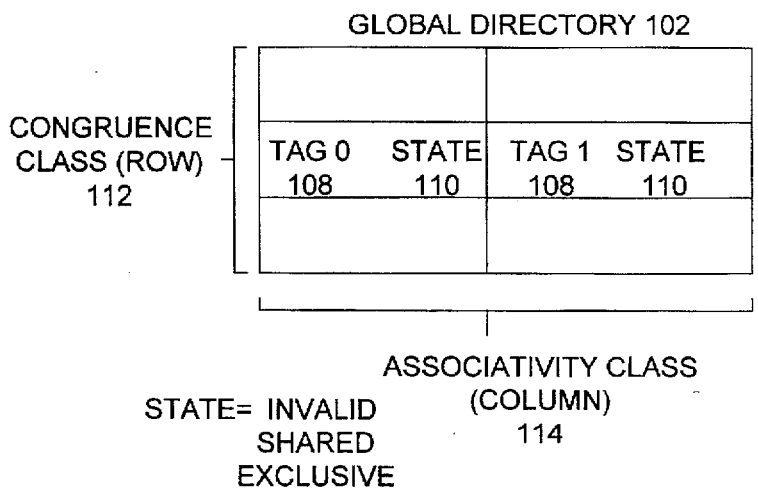
FIG. 1C is a block diagram illustrating a global directory of the present invention.

Having reference now to FIGS. 1A and 1C, in FIG. 1A there is shown a directory arrangement in accordance with the invention generally designated 100 including an N-way associative or global, coherence directory generally designated GDIR 102 with a content addressable memory (CAM) generally designated GDIR CAM 104. GDIR CAM 104 is used in accordance with the invention to improve the performance of the N-way associative directory GDIR 102. In accordance with features of the invention, a full congruence class or row 112, the entry from each associativity class or column 114, as illustrated in FIG. 1C including the entries TAG 0 108, STATE 0 110, TAG 1, STATE 1 110, is the unit of data moved between the coherence directory GDIR 102 and the GDIR CAM 104. In FIGS. 1A and 1C, a two-way associtive directory GDIR 102 and GDIR CAM 104 are shown; however, it should be understood that the present invention can be used generally with an N-way associative directory. In FIG. 1B, a prior art memory address format including an index, tag, and byte is shown. In the preferred embodiment, the lower order address bits or byte of the prior art memory address format is not used.

In the GDIR CAM 104, each GDIR CAM row 117 includes a single index 118, multiple keys or tags 120 and associated states 122 together with BDIR CAM row state information 123 including respective BUSY 0, BUSY 1, and DIRTY bits. Each key 120 and associated state 122, such as TAG 0, STATE 0, and TAG 1, STATE 1, corresponds to a respective associtiviy class 114, CLASS 0, CLASS 1 of the N-way associtive directory GDIR 102. Moving the full congruence class 112 avoids having to do read modify write when data is moved between GDIR CAM 104 and coherence directory GDIR 102. The GDIR CAM 104 contains GDIR entries that are in transition from one state to another state. The associated state 110, 122 with a respective directory tag 108, 120 include exclusive, shared, and invalid. An exclusive state indicates that one and only one cache in the system of the GDIR 102 has this block of data, where a shared state indicates that the block of data is shared. An invalid state indicates that the block of data is not cached.

GDIR CAM 104 serves as a CAM for directory entries. When an entry in the GDIR CAM 104 is updated and the operation using that entry is completed, that GDIR CAM row 117 is marked as dirty. Dirty GDIR CAM 104 entries are accumulated and scheduled for writing back to the global coherence directory GDIR 102. The accumulation of writebacks is more efficient because there is a number of cycles penalty for switching from read to write and vise-versa. The scheduling of these accumulated writebacks are more efficient because the writes are done when the global coherence directory GDIR 102 is idle. After the write-backs to the global coherence directory GDIR 102 are completed the entries of the GDIR CAM 104 are marked as not dirty and can be reused.

GDIR CAM 104 is a small CAM that duplicates some number of the directory rows 112 of GDIR 102. Global coherence directory GDIR 102 can be implemented with external SRAM off-chip because a large on-chip array may not be feasible to implement the total size needed for the global coherence directory GDIR 102. An arbitration (ARB) functional block 106 arbitrates access to GDIR 102 and GDIR CAM 104. ARB functional block 106 is implemented with logic arranged for directory access control of the invention as illustrated and described with respect to FIGS. 2–6. When an address is presented to the GDIR CAM 104, the address associated with the tag that matches this address is accessed. A Hit/Miss indication is provided by compares 116 and possibly, the location within the GDIR CAM 104 that address matched.

When a data line is accessed, the directory set or congruence class 112 of GDIR 102 that contains the line is read into the GDIR CAM 104. While an operation is pending the GDIR CAM row 117 including the particular congruence class entry 120, 122, TAG 0, STATE 0, or TAG 1, STATE 1 that contains the line is locked in place and released when the operation is finished. For an N-way associative directory GDIR 102, each of the N entries in a directory row may be locked by a different operation. When an operation modifies an entry in a GDIR CAM row 117 held in the GDIR CAM 104, that GDIR CAM row 117 is marked dirty to be written back to the directory when all entries are non-busy. The number of GDIR CAM rows 117 that the GDIR CAM 104 can hold advantageously can be provided to be greater than a maximum number of outstanding possible operations. The writing back dirty GDIR CAM rows 117 in the GDIR CAM 104 can be delayed until a number of GDIR CAM rows 117 are ready to be written back. Thus providing improved performance, for example, in synchronous SRAMs, grouping writes into adjacent cycles reduces the bandwidth taken up by writes to the SRAM. Also, a dirty GDIR CAM row 117 can be used by another data operation before being written back to the global coherence directory GDIR 102.

Figure 2:
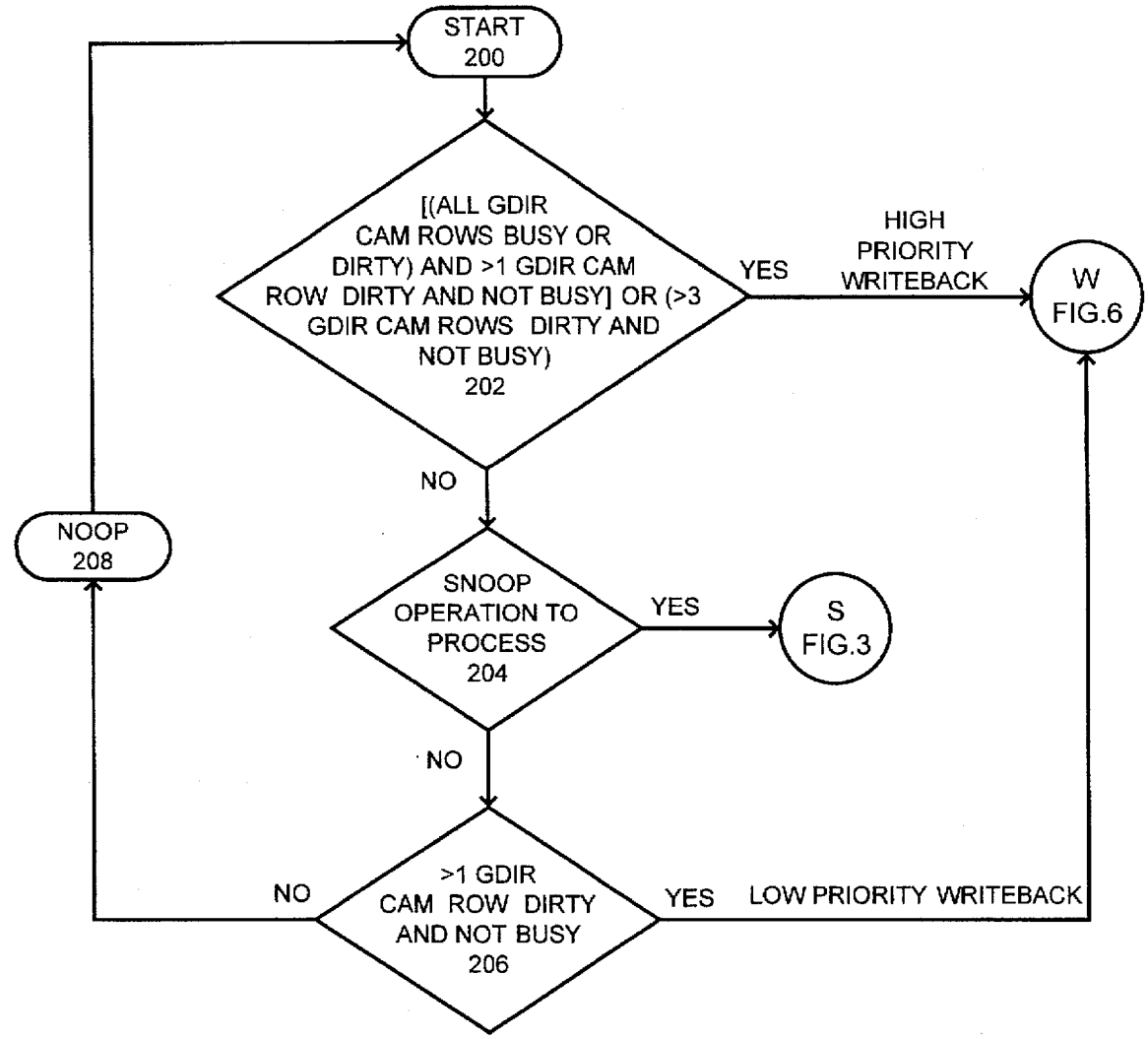

FIGS. 2–6 are flow charts illustrating directory maintenance methods in accordance with the present invention. Referring now to FIG. 2, arbitration (ARB) for access to GDIR 102 and GDIR CAM 104 start at a block 200. Checking whether all GDIR CAM rows 117 or all indexes in the GDIR CAM 104 are busy or dirty and more than one GDIR CAM row 117 is dirty and not busy; or more than a selected number of, for example, three GDIR CAM rows 117 in the GDIR CAM 104 are dirty and not busy is performed as indicated at a decision block 202. When determined at decision block 202 that all GDIR CAM rows 117 or all indexes in the GDIR CAM 104 are busy or dirty and more than one GDIR CAM row 117 or index is dirty and not busy; or more than the selected number of GDIR CAM rows 117 or indexes are dirty and not busy, then a high priority writeback is performed with the sequential operations continuing following entry point W in FIG. 6.

Otherwise when determined that it is not true at decision block 202 that all indexes in the GDIR CAM 104 are busy or dirty and more than one index is dirty and not busy; or more than the selected number of indexes are dirty and not busy, then checking for a snoop data operation to process is performed as indicated at a decision block 204. When a snoop data operation to process is identified at decision block 204, then the sequential operations continue following entry point S in FIG. 3. Otherwise when a snoop data operation to process is not identified at decision block 204 so that the global coherence directory GDIR 102 is idle, then checking whether the GDIR CAM 104 has more than one GDIR CAM row or index that are dirty and not busy is performed as indicated at a decision block 206. When determined at block 206 that the GDIR CAM 104 has more than one GDIR CAM row or index dirty and not busy, then a low priority writeback is performed with the sequential operations continuing following entry point W in FIG. 6. When determined at block 206 that the GDIR CAM 104 does not have more than one GDIR CAM row or index dirty and not busy, then the sequential steps return to start block 200 with no operation as indicated at a block 208.

Figure 3:
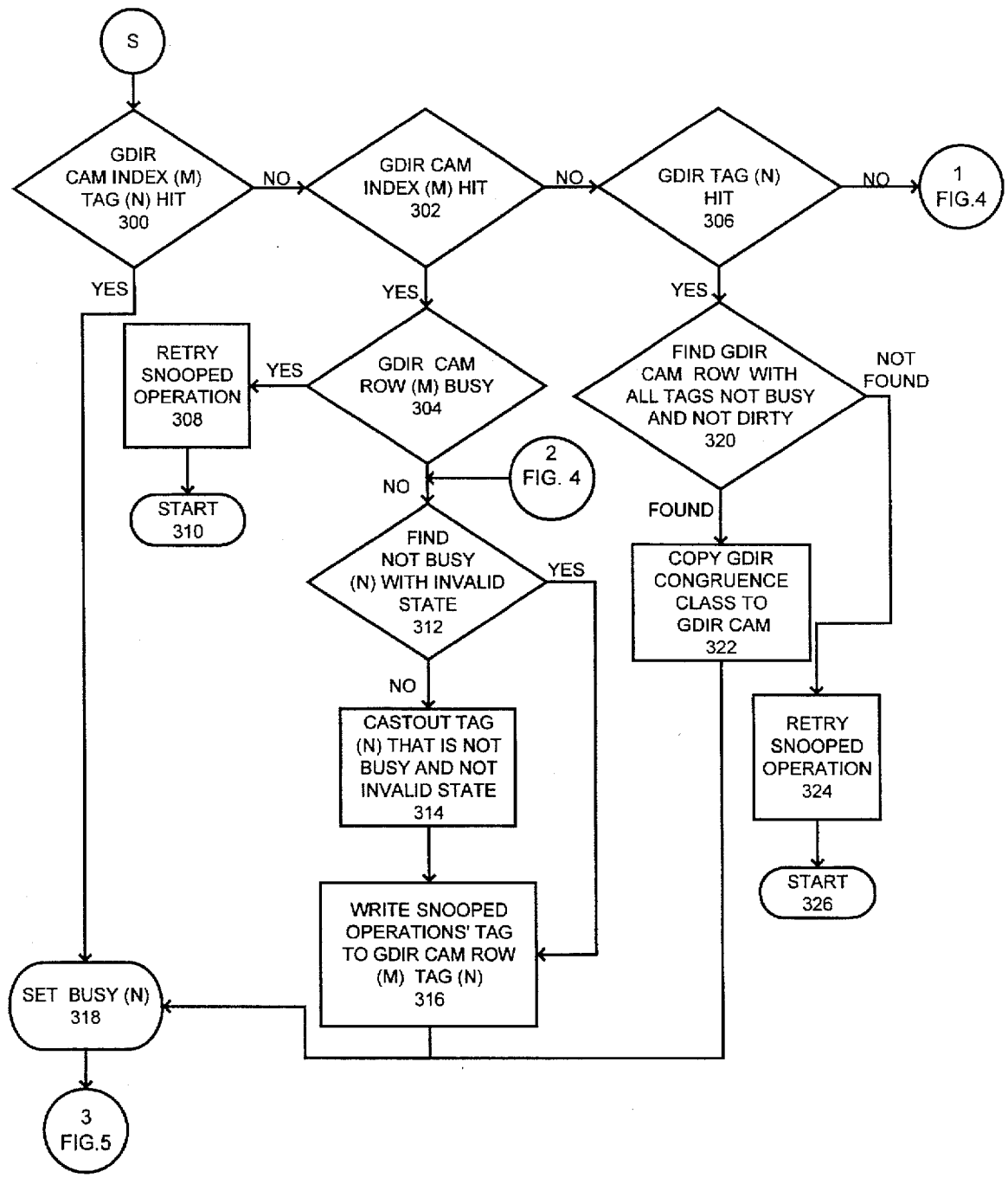

Referring to FIG. 3, when a snoop data operation to process is identified at decision block 204, then the sequential operations continue following entry point S. Checking for a GDIR CAM row or index (M) and tag (N) hit is provided as indicated at a decision block 300. When a GDIR CAM row (M) and tag (N) hit is not identified at block 300, then checking for a GDIR CAM row or index (M) hit is performed as indicated at a decision block 302. When a GDIR CAM row or index (M) hit is identified at block 302, then checking whether all tags are busy at GDIR CAM row (M) in the GDIR CAM is performed as indicated at a decision block 304. When a GDIR CAM row (M) hit is not identified at block 302, then checking for a global directory tag (N) hit is provided as indicated at a decision block 306. When a global directory tag (N) hit is not identified at decision block 306, then the sequential steps continue following entry point 1 in FIG. 4.

Figure 4:
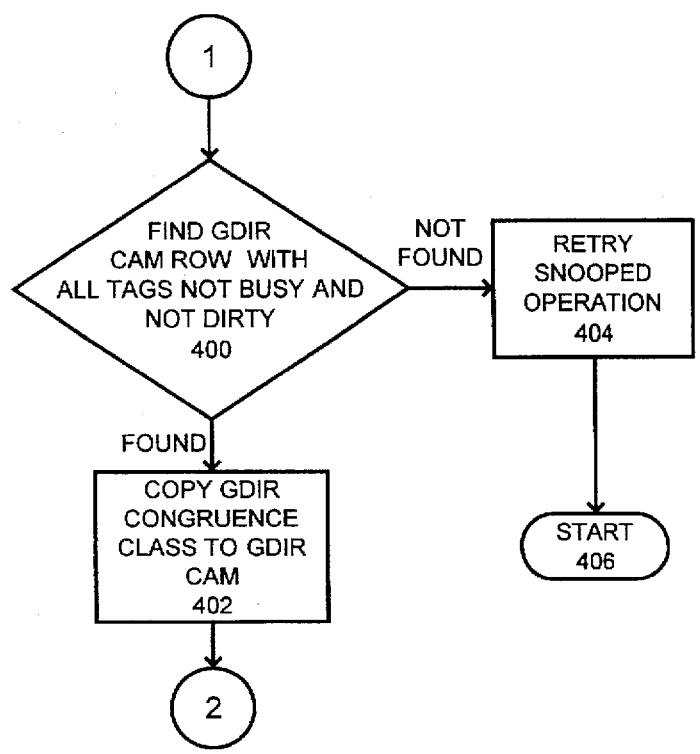

Referring to FIG. 4, following entry point 1 checking for a GDIR CAM row with all tags not busy and not dirty is provided as indicated at a decision block 400. When a GDIR CAM row with all tags not busy and not dirty is found at decision block 400, then the congruence class is copied to the identified GDIR CAM row as indicated at a block 402. Then the sequential operations return following entry point 2 in FIG. 3. Otherwise when a GDIR CAM row with all tags not busy and not dirty is not found at decision block 400, then the snooped data operation is retried as indicated at a block 404. Then the sequential steps return to start block 200 in FIG. 2 as indicated at a block 406.

Referring again to FIG. 3, when determined at block 304 that all tags are busy at index (M) in the GDIR CAM, then the snooped data operation retried as indicated at a block 308. Then the sequential steps return to start block 200 in FIG. 2 as indicated at a block 310. When determined at block 304 that all tags are not busy at index (M) in the GDIR CAM and following an entry point 2 in FIG. 4, then checking for a not busy tag (N) with an invalid state is performed as indicated at a decision block 312. When a not busy (N) with tag (N) having an invalid state is not found at decision block 312, then tag (N) that is not busy and not invalid state is castout as indicated at a block 314. Then the snooped data operations' tag is written to the GDIR CAM (M) and tag (N) as indicated at a block 316. After the snooped data operations' tag is written at block 316 and when a GDIR CAM index (M) and tag (N) hit is identified at block 300, the busy (N) is set as indicated at a block 318. Then the sequential operations continue following entry point 3 in FIG. 5.

When a global directory tag (N) hit is identified at decision block 306, then checking for a GDIR CAM row not busy and not dirty is provided as indicated at a decision block 320. When a GDIR CAM row not busy and not dirty is found at decision block 320, then the congruence class is copied to the identified GDIR CAM row as indicated at a block 322. Then the steps continue at block 318 where the tag busy (N) is set. When a GDIR CAM row with all tags not busy and not dirty is not found at decision block 320, then the snooped data operation is retried as indicated at a block 324. Then the sequential steps return to start block 200 in FIG. 2 as indicated at a block 326.

Figure 5:
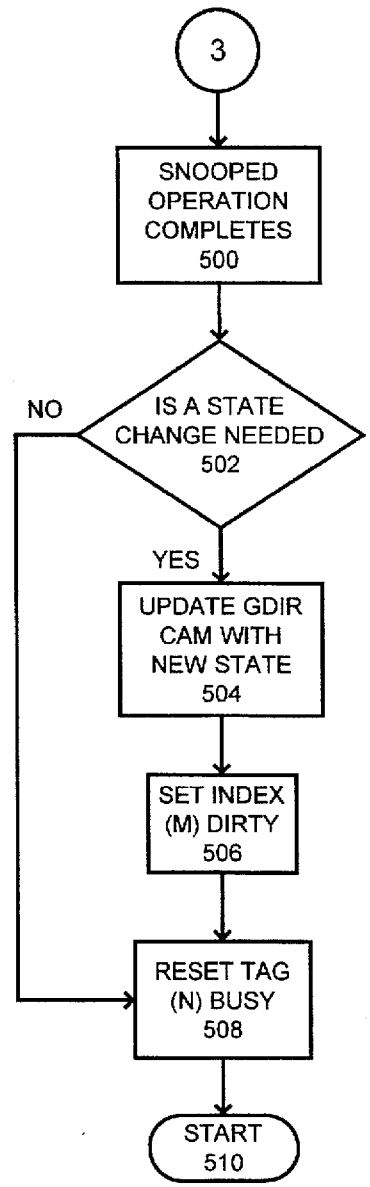

Referring now to FIG. 5, following entry point 3, the snooped data operation completes as indicated at a block 500. Then it is determined whether a state change is needed as indicated at a decision block 502. When determined that a state change is needed at block 502, then the GDIR CAM is updated with the new state as indicated at a block 504. Next the index (M) is set dirty as indicated at a block 506. When determined that a state change is not needed at block 502 and after the index is set dirty at block 506, then the tag (N) busy is reset as indicated at a block 508. Then the sequential steps return to start block 200 in FIG. 2 as indicated at a block 510.

Figure 6:
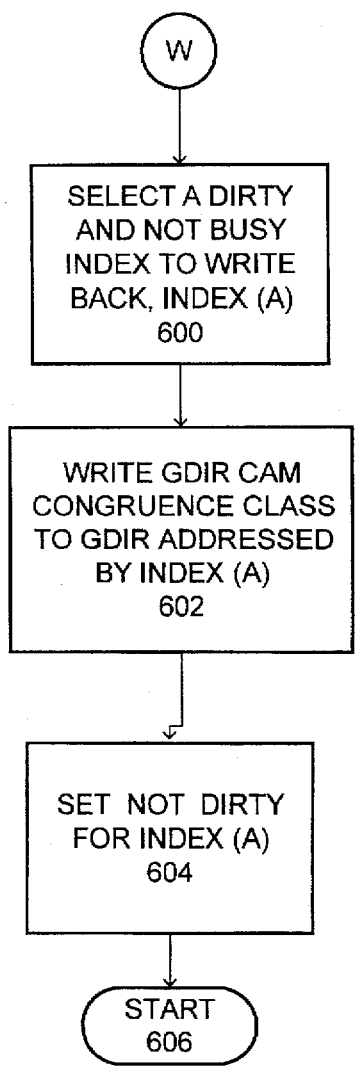
FIGS. 2–6 are flow charts illustrating directory maintenance methods in accordance with the present invention.

FIG. 6 illustrates writeback control flow for writing dirty entries of GDIR CAM 104 back to GDIR 102. The writeback steps begin following entry point W in FIG. 6 with selecting a dirty and not busy index to write back, index (A) as indicated at a block 600. The congruence class addressed by index (A) is written to the GDIR 102 as indicated at a block 602. Then the GDIR CAM 104 is set to not dirty for Index (A) as indicated at a block 606. Then the sequential steps return to start block 200 in FIG. 2 as indicated at a block 606.

While the present invention has been described with reference to the details of the embodiments of the invention shown in the drawing, these details are not intended to limit the scope of the invention as claimed in the appended claims.

What is claimed is:

1. A method for maintaining a N-way associative directory utilizing a content addressable memory (CAM) comprising the steps of:

identifying a data operation to process;
   identifying a congruence class from the N-way associative directory including a directory entry for said data operation; said congruence class directory entry including multiple (N) directory entries for each associativity class;
   reading said congruence class from the N-way associative directory and writing said read congruence class into the CAM;
   locking said directory entry for said data operation in CAM while said data operation is pending;
   checking for a state change when said data operation is completed; and
   updating said directory entry for said data operation in CAM responsive to said identified state change.

2. A method for maintaining a N-way associative directory utilizing a content addressable memory (CAM) as recited in claim 1 further includes the steps of:

accumulating a predefined number of said congruence classes including said updated directory entry in CAM; and
   writing one of said congruence classes including said updated directory entry in CAM back to the N-way associative directory responsive to said accumulated predefined number of said congruence classes including said updated directory entry.

3. A method for maintaining a N-way associative directory utilizing a content addressable memory (CAM) as recited in claim 2 further includes the step of responsive to writing said congruence class including said updated directory entry in CAM back to the N-way associative directory, marking said congruence class directory entries in CAM as not busy and not dirty, whereby said CAM entry can be reused.

4. A method for maintaining a N-way associative directory utilizing a content addressable memory (CAM) as recited in claim 2 wherein said step of writing said updated congruence class directory entry in CAM back to the N-way associative directory includes the steps of:

selecting an index in CAM to write back; said selected index being an index set dirty and not busy;
   writing said congruence class in CAM back to the N-way associative directory addressed by said selected index; and
   resetting said dirty indication for said selected index in CAM.

5. A method for maintaining a N-way associative directory utilizing a content addressable memory (CAM) as recited in claim 1 wherein said step of locking said directory entry for said data operation in CAM while said data operation is pending includes the step of setting a busy indication for a tag associated with said data operation and resetting said busy indication for said tag associated with said data operation when said data operation is completed.

6. A method for maintaining a N-way associative directory utilizing a content addressable memory (CAM) as recited in claim 2 further includes the step of:

identifying an idle state for the N-way associative directory;
   identifying a second predefined number of said congruence classes including said updated directory entry in CAM; and
   writing a selected one of said congruence classes including said updated directory entry in CAM back to the N-way associative directory responsive to said identified second predefined number of said congruence classes including said updated directory entry in CAM.

7. A method for maintaining a N-way associative directory utilizing a content addressable memory (CAM) as recited in claim 6 wherein said step of identifying said idle state for the N-way associative directory includes the step of identifying no data operations to process.

8. Apparatus for maintaining a N-way associative directory utilizing a content addressable memory (CAM) comprising:

means for identifying a data operation to process;
   means for identifying a congruence class from the N-way associative directory including a directory entry for said data operation; said congruence class directory entry including multiple (N) directory entries for each associativity class;
   means for reading said congruence class from the N-way associative directory and for writing said read congruence class into the CAM;

means for locking said directory entry for said data operation in CAM while said data operation is pending;

means for identifying a state change when said data operation is completed; and means for updating said directory entry for said data operation in CAM responsive to said state change identifying means.

9. Apparatus for maintaining a N-way associative directory utilizing a content addressable memory (CAM) as recited in claim 8 wherein said congruence class in CAM includes a single index.

10. Apparatus for maintaining a N-way associative directory utilizing a content addressable memory (CAM) as recited in claim 9 wherein each said multiple (N) directory entries for each associativity class includes a tag and an associated state.

11. Apparatus for maintaining a N-way associative directory utilizing a content addressable memory (CAM) as recited in claim 10 wherein said means for updating said directory entry for said data operation in CAM responsive to said state change identifying means includes means for updating an associated state with a tag of one of said multiple (N) directory entries for said identified data operation.

12. Apparatus for maintaining a N-way associative directory utilizing a content addressable memory (CAM) as recited in claim 11 further includes means responsive to said state change identifying means for setting a changed indication for said index for said congruence class in CAM.

13. Apparatus for maintaining a N-way associative directory utilizing a content addressable memory (CAM) as recited in claim 11 further includes means for accumulating a predefined number of said congruence classes including said updated directory entry in CAM; and means for writing back at least one of said congruence classes including said updated directory entry in CAM to the N-way associative directory responsive to said accumulated predefined number of said congruence classes including said updated directory entry in CAM.

14. Apparatus for maintaining a N-way associative directory utilizing a content addressable memory (CAM) as recited in claim 13 further includes means responsive to said congruence class writing back means for marking said multiple directory entries (N) in said at least one congruence class in CAM as not busy and said at least one congruence class as not dirty, whereby said CAM index can be reused.

15. Apparatus for maintaining a N-way associative directory utilizing a content addressable memory (CAM) as recited in claim 12 wherein said means for writing back at least one of said congruence classes including said updated directory entry in CAM to the N-way associative directory include means for selecting an index in CAM to write back; said selected index being an index set changed and said multiple directory entries (N) in said congruence class in CAM set as not busy; means for writing said congruence class directory entry in CAM back to the N-way associative directory addressed by said selected index; and means for resetting said changed indication for said selected index in CAM.

16. Apparatus for maintaining a N-way associative directory utilizing a content addressable memory (CAM) as recited in claim 15 further include means for identifying an idle state of the N-way associative directory; means for identifying a second predefined number of said congruence classes including said updated directory entry in CAM; said second predefined number being less than said first predefined number; and means for writing a selected one of said congruence classes including said updated directory entry in CAM back to the N-way associative directory responsive to said identified second predefined number of said congruence classes including said updated directory entry in CAM.

* * * * *